United States Patent

Land

[15] 3,672,281

[45] June 27, 1972

[54] REFLEX CAMERA

[72] Inventor: Edwin H. Land, Cambridge, Mass.

[73] Assignee: Polaroid Corporation, Cambridge, Mass.

[22] Filed: April 15, 1970

[21] Appl. No.: 28,567

[52] U.S. Cl. .................................................. 95/42, 95/49
[51] Int. Cl. ................................................... G03b 19/12
[58] Field of Search ..................................... 95/42, 49

[56] References Cited

UNITED STATES PATENTS

| | | | |
|---|---|---|---|
| 3,401,614 | 9/1968 | Gunther | 95/42 |
| 3,521,542 | 7/1970 | Goederen | 95/42 |
| 3,515,048 | 6/1970 | Koch | 95/49 |
| 3,507,199 | 4/1970 | Sato | 95/42 |
| 2,914,997 | 12/1957 | Grey | 95/42 |
| 3,498,198 | 3/1970 | Fujii | 95/42 |

FOREIGN PATENTS OR APPLICATIONS

| | | |
|---|---|---|
| 15,199 | 7/1907 | Great Britain |
| 687,374 | 2/1953 | Great Britain |
| 559,140 | 2/1944 | Great Britain |
| 933,132 | 9/1955 | Germany |

Primary Examiner—Samuel S. Matthews
Assistant Examiner—Michael Harris
Attorney—Brown and Mikulka, William D. Roberson and Gerald L. Smith

[57] ABSTRACT

A reflex camera having a specular reflecting surface within the optical path to the film plane. An operator mechanism positions a viewing surface closely proximate the film plane for focusing purposes. In a subsequent exposure mode configuration, the operator mechanism positions a reflective surface within the optical path in a position causing a coincidence of a focal plane with the film plane.

37 Claims, 7 Drawing Figures

INVENTOR.
EDWIN H. LAND

BY Brown and Mikulka
and
Gerald L. Smith
ATTORNEYS

INVENTOR.
EDWIN H. LAND

INVENTOR.
EDWIN H. LAND

BY Brown and Mikulka
and
Gerald L. Smith
ATTORNEYS

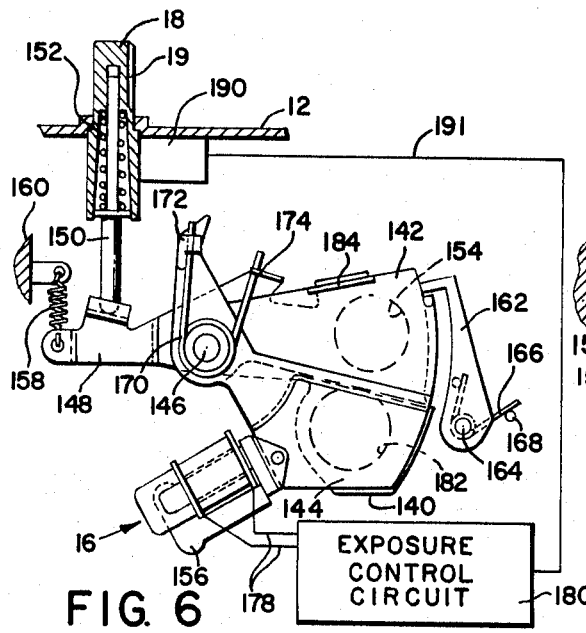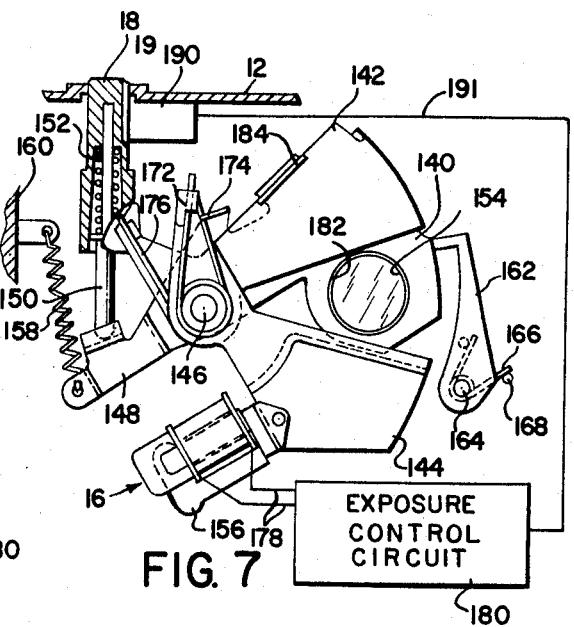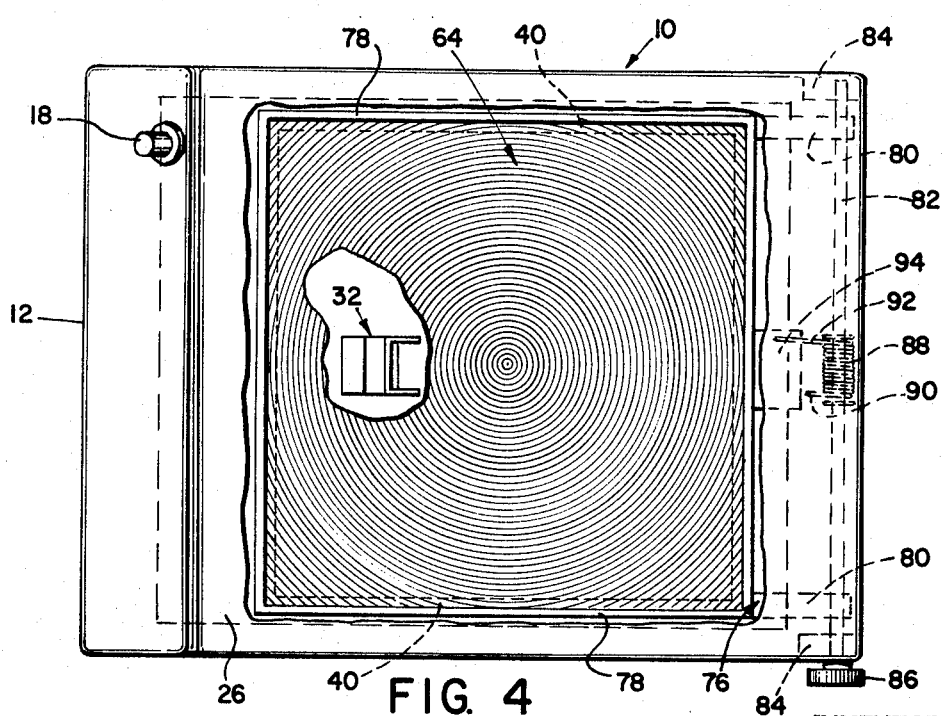

REFLEX CAMERA

The present invention is concerned with photographic cameras of a reflex type and, more particularly, to a reflex camera in which a specular reflecting surface is moved into the optical path of a taking lens when the camera is caused to assume an exposure configuration.

BACKGROUND

Certain photographic film materials are structured to directly record a positive image of any subject properly imaged and exposed thereupon. Exemplary of such materials are the film units described in a U. S. Pat. to E. H. Land, No. 3,415,646, entitled "Novel Photographic Products and Processes". Film units of this type are intended for use within the above noted self-processing photographic cameras and incorporate all the materials necessary to produce a positive photographic print immediately following their exposure. While being of somewhat complex chemical make-up, the film units are physically structured to include a planar photosensitive element in laminar combination with a transparent image receiving element. Specially packaged processing units are additionally included within the units.

To image properly through a lens system upon the above-described film units, it is necessary that one or an odd number of specularly reflecting surfaces be incorporated within the optical path extending from the camera lens to the exposure plane of a film unit. Because these film units are configured to provide a desirably large film format, certain improved photographic camera designs have taken advantage of the requisite specular reflecting surface to achieve somewhat compact overall camera structures. Exemplary of such compact designs is a camera structure described in a co-pending application for U. S. Pat. entitled "Folding Camera" by E. H. Land and A. H. Bellows Serial No. 655,850, filed July 25, 1967 and assigned in common herewith.

While the above referenced cameras retain the desirable feature of incorporating both exposure control systems as well as film processing mechanisms within a very restricted space limitation, their overall shape does not lend itself to the convenient external mounting of optical ranging and viewfinding systems.

SUMMARY

The invention now presented provides a photographic camera configured to incorporate a specularly reflecting surface within the optical path configuration extending from its objective lens to a given focal plane. This reflecting surface is uniquely movable to achieve a reflex operation of the camera. During an exposure mode of operation of the camera, the reflecting surface is moved into the above-noted optical path to alter the position of its focal plane into coincidence with an exposure plane. The latter exposure plane is established by the position of the image receiving surface of a film unit.

When the camera is operated in a focusing mode, the aforedescribed reflecting surface is moved out of its optical path position coincidently with the covering of the film unit at the exposure plane. The latter covering of the photosensitive film unit is provided in a manner establishing a reflective viewing surface spaced closely adjacent, forwardly of, and parallel to the exposure plane. Movement of the reflecting surface also permits the introduction into the optical path of a second stationary reflecting surface the position of which is spaced from the exposure mode location of the movable reflecting surface. The relative positions of the stationary second reflecting surface and the viewing surface are such as to establish a coincidence of the optical path focal plane with the viewing surface. As a consequence, during a focusing mode of operation, an image of the scene to be photographed is presented at the viewing surface. This image may be observed from a side of the viewing surface on which light is incident. The dual mode reflex system achieved with the foregoing arrangement is ideally suited for use with cameras incorporating a feature for developing film units as an adjunct to their exposure.

In a preferred embodiment of the invention, the movable specularly reflecting surface is mounted upon a simple supporting structure. This structure, termed an operator member, is transferable between two terminal positions. The operator member is of generally planar configuration, supporting the movable reflecting surface on one side and a viewing surface adjacent thereto on its opposite side. In a focusing mode of operation, the operator member is moved over the exposure surface of a film unit in a manner covering the photosensitive surface in light sealing fashion. In this focusing orientation, the viewing surface of the operator unit is parallel to and displaced forwardly from the film exposure plane by a relatively close predetermined distance.

Permanently mounted within the camera body is a stationary specularly reflecting surface positioned behind the operator unit when in an exposure mode orientation so as to be introduced to the camera optical path upon the movement of the operator unit to a focusing mode orientation. The positioning of the stationary reflecting surface is selected relative to that of the viewing surface so that the optical path lengths of the camera in both a focusing and exposure mode are rendered equivalent.

Following focusing procedures, the operator unit is transferred into an exposure orientation adjacent the stationary reflecting surface, thereby uncovering the exposure plane surface of a film unit to permit conventional photographic exposure procedures to be carried out.

A further feature and object of the invention is to provide a photographic camera of a reflex type wherein an optical path of given length extending from an objective lens to a focal plane is altered between a focusing mode configuration and an exposure mode configuration. In its focusing mode configuration, a stationary reflecting surface is incorporated within the optical path in conjunction with a movable viewing surface positioned closely proximate to and having covering relationship with an exposure plane. In its exposure mode, a movable reflecting surface is positioned forwardly of the stationary reflecting surface and the viewing surface is removed from the optical path. In the resultant exposure orientation, the focal plane of the optical path becomes coincident with the exposure plane of the film unit, whereas, in a focusing mode configuration, this focal plane becomes coincident with the viewing surface.

Another feature and object of the invention is to provide a photographic camera of the type described which incorporates an operator unit for selectively manipulating a reflecting surface and a viewing surface so as to establish optical path configurations for focusing and exposing a photosensitive media of the type described. The operator unit may serve the additional function of blocking light from reaching the camera exposure plane during focusing operation. During focusing, this viewing surface is observable from an opening within the camera positioned on the side of the viewing surface upon which light is incident. To enhance observation of the image focused at the viewing surface, the latter may be formed incorporating an eschelon for Fresnel lens surface.

Other objects of the invention will in part be obvious and will in part appear hereinafter.

The invention accordingly comprises the apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 4 is a top view of the camera of the present invention having portions broken away to reveal internal structure;

FIG. 6 is a plan view of a shutter arrangement which may be used with the camera of the invention; and FIG. 7 is a plan view of the shutter arrangement of FIG. 6 showing the orientation of its components in an aperture unblocking configuration.

DETAILED DESCRIPTION

Figure 1:
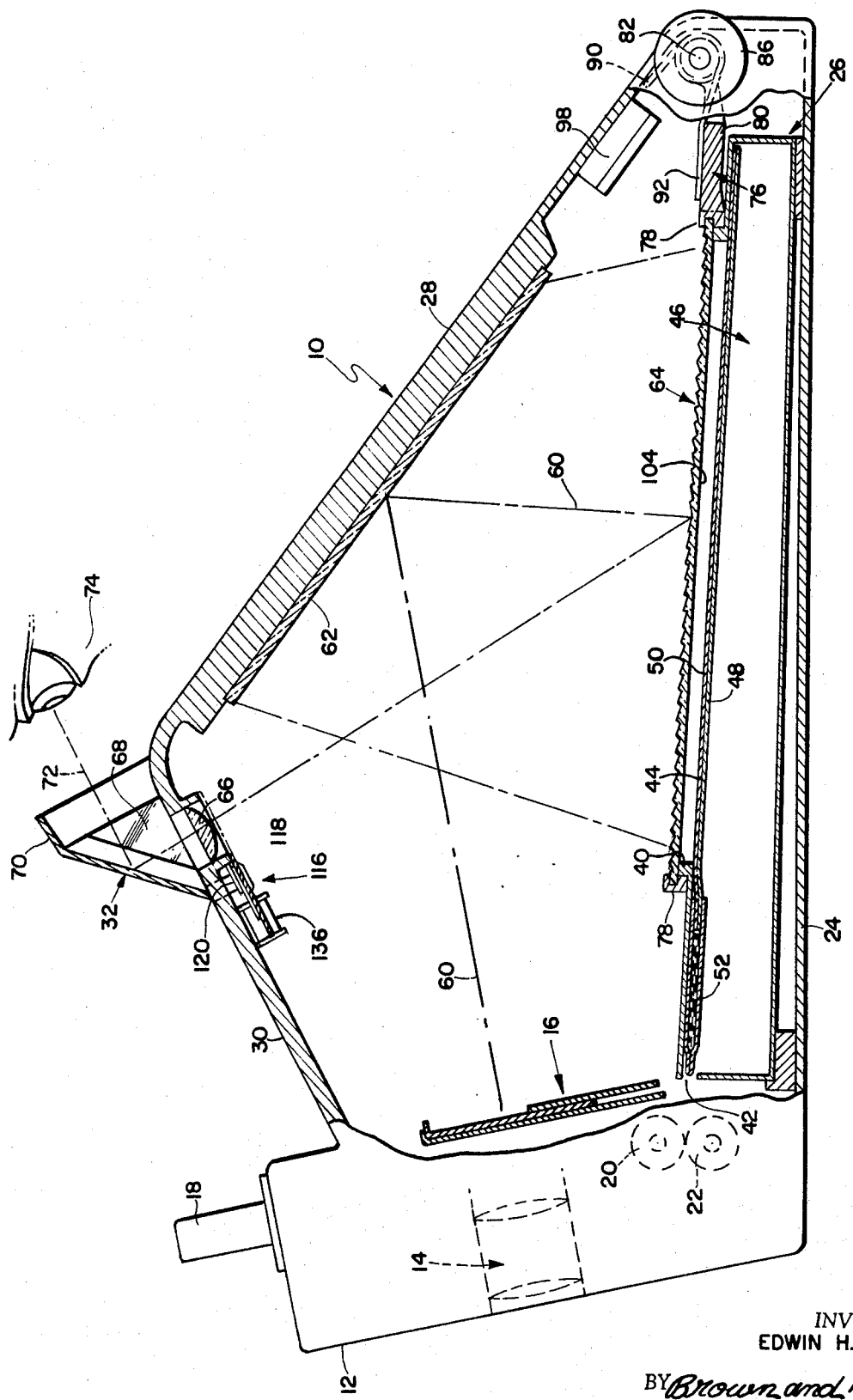
FIG. 1 is a sectional view of a photographic camera according to the present invention showing the orientation of certain of its components during a focusing mode of operation.
Figure 2:
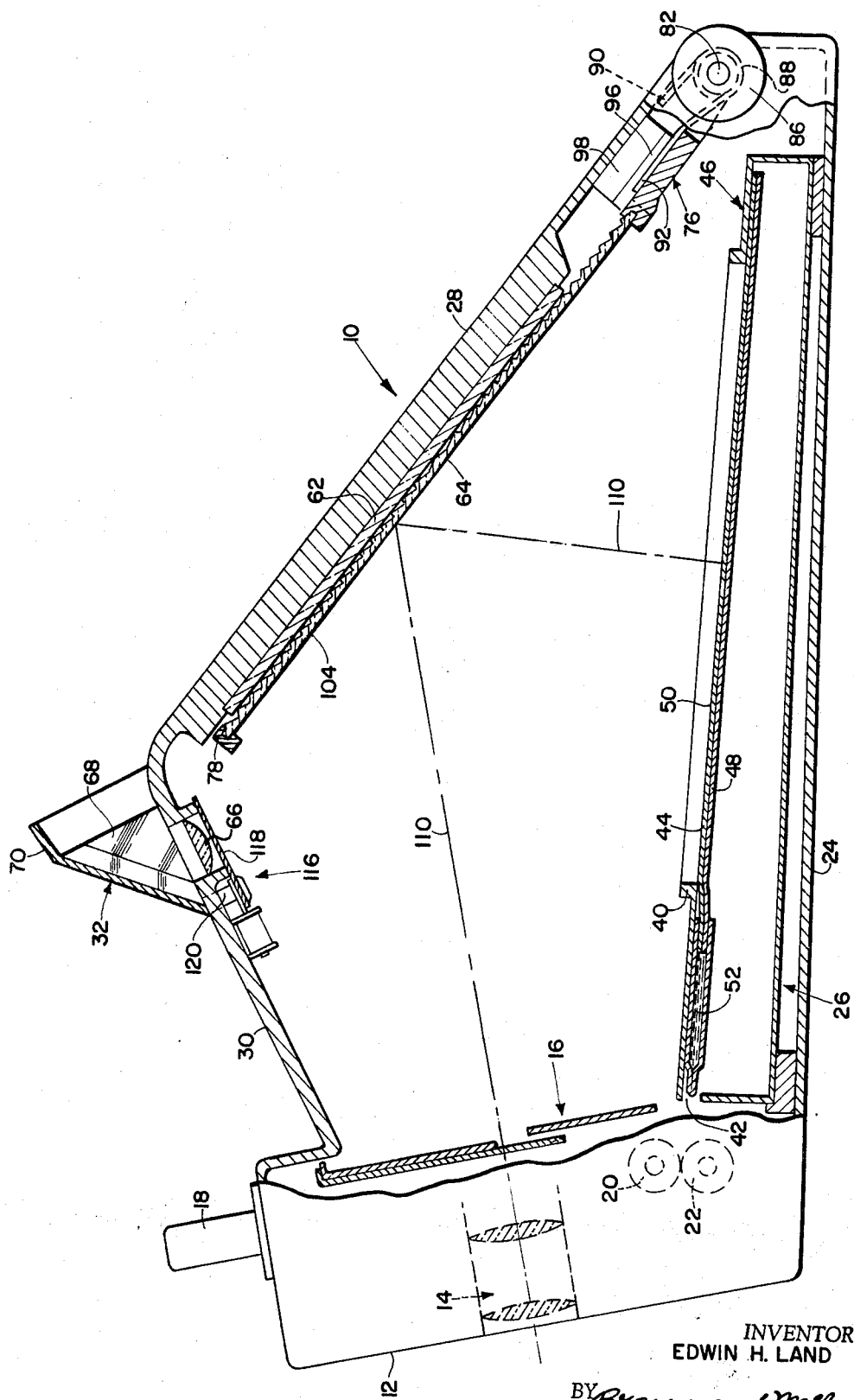
FIG. 2 is a sectional view of a camera according to the present invention showing certain of its components during an exposure mode of operation.
Figure 3:
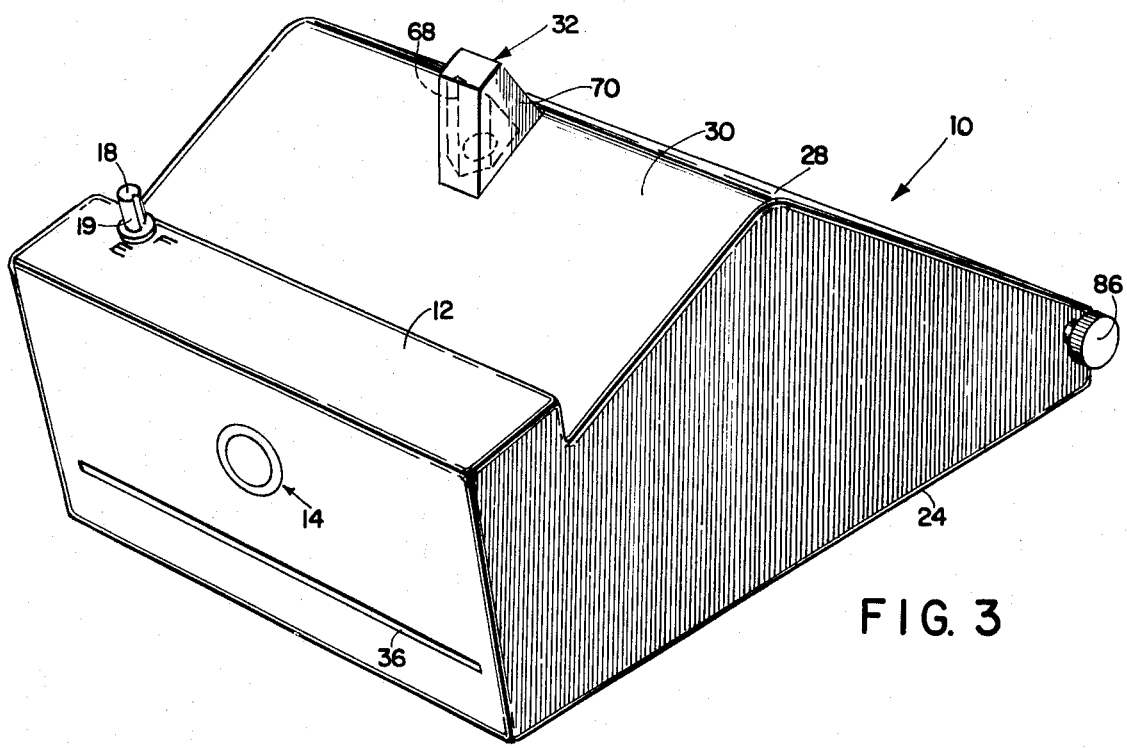
FIG. 3 is a perspective view of a camera structured in accordance with the present invention showing the general outlines of its configuration.

Referring to FIGS. 1 through 3, a photographic camera is illustrated generally at 10. Camera 10 is formed having a forwardly disposed exposure control system housing 12 within which are mounted all of the components required to regulate light passing into the camera. These components include, but are not limited to, an objective lens system shown generally at 14, a shutter mechanism shown generally at 16, a shutter release button 18, electronic control circuitry and the film unit processing rolls 20 and 22. The camera 10 is of a reflex variety having a bottom support portion 24 which serves as a receiving and retaining chamber for a film laden cassette structure as at 26. The uppermost surfaces of the camera 10 include a relatively elongated top wall section 28 which will be seen to support reflecting surfaces of a reflex optical system. Elongated top wall 28 is joined with a shorter forward wall portion 30 which serves to support a viewing arrangement shown generally at 32.

Film retaining cassette 26, positioned within the bottom support housing 24 of the camera, is formed as a generally thin parallelepiped having a top open portion, the rectangular periphery of which is defined by an integrally formed ridge 40. The forwardmost facing side of cassette 26 is formed incorporating an opening or slot 42 aligned with the line of tangency between rolls 20 and 22. Cassette 26 is removably insertable within a cassette receiving chamber within bottom support portion 24 so as to consistently and accurately orient an exposure plane 44 established at the lowermost periphery of the film frame opening defined by ridge 40. A detailed disclosure of mechanisms for supporting cassettes as at 26 within the camera 10 are disclosed in the earlier cited application of E. H. Land and A. H. Bellows.

Coincidently situated at the exposure plane 44 is an uppermost one of a plurality of the film units 46. Described in detail in the above referenced U. S. Patent of E. H. Land, film units as at 46 include all of the materials necessary to produce a positive photographic print. Each unit 46 is physically structured to include a photosensitive element 48 positioned adjacent and in laminar relationship with an image-receiving element 50. Image-receiving element 50 is located upwardly from element 48 and is urged by spring means (not shown) into the exposure plane 44. A rupturable container 52 of processing fluid is secured to one end of the laminar assembly of elements 48 and 50 and is located forwardly within the cassette structure 26. Containers 52 dispense their processing fluid between elements 48 and 50 when subjected to appropriate compressive pressure. Each film unit as at 46 is adapted to be processed when advanced, rupturable container 52 foremost, through slot 42 and between pressure applying processing rolls 20 and 22. The latter manipulation causes container 52 to dispense its fluid contents between elements 48 and 50 and to spread the fluid between and in contact with these two elements. The image-forming process is now well-known in the art and involves the formation of transverse image-forming substances in the exposed photosensitive element accompanied by their diffusion in a manner forming a visible, positive image. In the film unit 46 shown herein and described in the aforementioned United States Patent, the processing fluid includes an opacifying agent which is spread as a layer between the photosensitive element 48 and transparent element 50. The opacifying agent is opaque to actinic light and provides a background for the photosensitive transfer image evolved in the process.

The components of camera 10 normally assume a configuration for operation in a focusing mode. During a photographic cycle, however, these components are reoriented to assume an exposure mode configuration. Looking to FIG. 1, the components of camera 10 are shown as they assume a focusing mode configuration. In this configuration, the lens system as shown only generally at 14 may be considered to define a mean optical path which, for illustrative purposes, is designated by path line 60. The optical path as designated at 60, passes from the lens system 14 and across the exposure chamber of the camera until it impinges upon and is reflected from a specular reflecting surface shown as a mirror 62. Mirror 62 is stationary and fixed to the elongated top wall section 28 of camera 10. Upon reflection from mirror 62, the optical path courses to a viewing surface depicted generally at 64. As shown additionally in FIG. 4, reflective surface 64 is formed as an echelon or Fresnel mirror with its incremental sections angularly oriented to re-direct the image formed by the rays reflecting from mirror 62 toward the eye piece lens 66 of viewing arrangement 32.

Light rays re-directed from viewing surface 64 are illustrated by a path line 72. From lens 66, path 72 passes through an Amici element or roof prism 68 mounted within an eye piece housing 70. Housing 70 is attached to forward wall section 30 at a position suitable for viewing from a station as at 74. The presence of this roof prism 68 provides a right-left reversal correction for facilitating operator viewing from the eye station 74.

With the arrangement above described, camera 10 may be focused by adjusting lens system 14 while simultaneously viewing the image projected to viewing surface 64 from viewing arrangement 32. With this focusing mode of operation, optical path 60 may be considered to have a predetermined length and lens system 14 may be considered to establish a focal plane which, when the camera is focused, lies in coincidence with the viewing surface 64.

Viewing surface 64 is mounted upon or formed as an integral component of an operator unit shown generally at 76. Formed of a material opaque to light, unit 76 is of generally flat configuration and includes a peripheral rib portion or frame 78. Frame 78 is rectangular in shape and dimensioned to nest over the rib 40 of film cassette 26. As a consequence of this configuration, the operator unit 76 serves to light seal or cap the exposure plane 44 at which a film unit 46 is positioned. As seen in FIG. 4, peripheral frame 78 of operator unit 76 is formed integrally with hinge portions 80 which are fixed to an axle 82. Axle 82 is journaled for rotation within sections 84 of the housing of camera 10. Extending through a section 84 at one side of the camera housing, axle 82 is fixed to a hand-manipulated knob 86.

The viewing surface 64 of operator unit 76 is biased into the focusing mode orientation shown in FIG. 1 by a centrally disposed helical spring 88. Spring 88 has a stationary side 90 positioned in abutment against top side 28 of the camera housing and a movable side 92 tensioned against a central portion 94 of the operator unit 76 assembly. A magnetizable metal insert 96 is fixed to portion 94 of the operator unit 76. Insert 96 forms part of a magnetic latching assembly including a permanent magnet 98 fixed to the inward side of top wall section 28.

Turning to FIG. 2, the components of camera 10 are shown as they assume an exposure mode configuration, as opposed to the focusing mode illustration described in connection with FIGS. 1 through 4. To convert the camera 10 to the exposure mode configuration, knob 82 of operator unit 76 is rotated against the bias of spring 88 until metallic insert 96 contacts and is attached to magnet 98. When so magnetically latched, mirror 62 is isolated from the earlier derived optical path 60; viewing surface 64 is removed from the exposure plane 44;

and a second, specularly reflecting surface 104 is introduced in operative position within the exposure chamber. With the resulting configuration, lens system 14 may be considered to define a mean optical path which, for illustrative purposes, is designated by a path line 110. Optical path 110 passes from the lens system 14 and across the exposure chamber of the camera until it imginges upon and is reflected from second specularly reflective surface 104. Upon reflection from reflecting surface 104, the optical path courses to the exposure plane described at 44. In this orientation, therefore, the uppermost of the film units 46 may be exposed and thereafter drawn through slot 42, into processing rolls 20 and 22 to exit therefrom at a slot 36 formed in the front portion of the camera, (see FIG. 3).

With the arrangement of components as shown in FIG. 2, the optical path 110 is of length equivalent to that of the optical path 60 derived from a focusing mode configuration of the camera 10. This path length equalization is achieved by virtue of the removal of viewing surface 64 from its position closely proximate but a finite distance displaced from exposure plane 44, accompanied by the repositioning of a specularly reflecting surface 104 along wall section 28 of the camera. Note in this regard that specular reflecting surface 104 is displaced an equivalent finite distance from the reflecting surface mirror 62. In the exposure mode depicted, the focal plane evolved from lens system 14 now coincides with the exposure plane 44.

Figure 5:
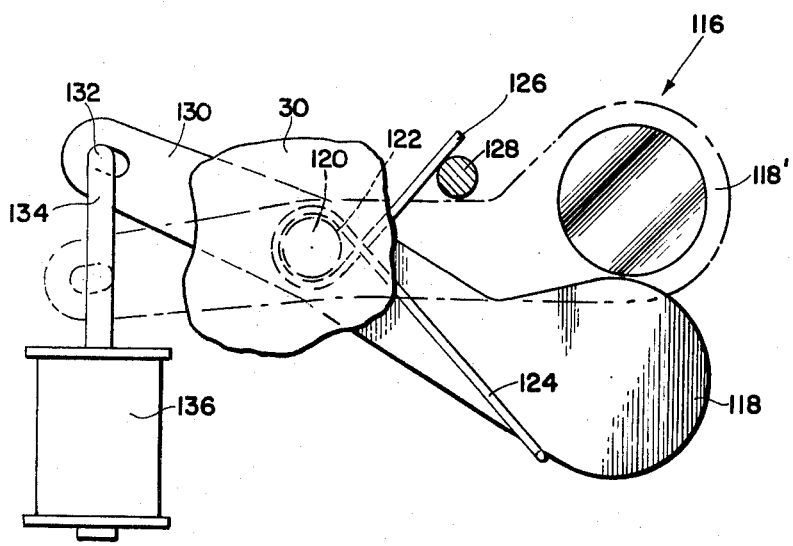
FIG. 5 is a fragmentary view of a shutter mechanism operative in conjunction with the viewing system of the camera of the invention.

The mechanisms which support the exposure mode and focusing mode operation of the camera 10 components thus far described are depicted in detail in FIG. 5 through 7. Referring to FIG. 5 in addition to FIGS. 1 and 2, a subsidiary shutter mechanism is illustrated at 116. Shutter 116 functions to block the opening defined by eye lens 66 of viewing arrangement 32 throughout the operation of the camera when the latter is in an exposure mode. Shutter 116 is formed having a simple capping blade 118 which is movable into a blocking position as shown in phantom at 118'. Blade 118 is rotatably mounted upon a stud 120 extending into forward top wall 30. The blade 118 is biased for rotation into blocking position 118' by a wire spring 122. Spring 122 is formed having a movable side 124 coupled with blade 118 and a stationary side 126 located in abutment against a stud 128. Stud 128 extends from top wall portion 30. Blade 118 is also fashioned having an extending arm portion 130 which is pivotally attached at 132 to the movable center core or rod 134 of a solenoid 136. Once energized, solenoid 136 causes rod 134 to move outwardly from its internal position, thereby rotating blade 118 from its blocking position at 118' to its open position 118.

Turning to FIGS. 6 and 7, the shutter mechanism described earlier at 16 is depicted in detail. Mechanism 16 is mounted upon a lens board or supporting panel situated within housing 12 of the camera. The mechanism 16 is formed of three basic blade elements, namely, a capping blade 140, a shutter opening blade 142 and a shutter closing blade 144. Blades 140, 142 and 144 are mounted for rotation co-axially about a stud 146 extending from the supporting panel. An extension 148 of capping blade 140 extends outwardly from its axis of rotation at 146 to abut against an internal push rod 150 extending from shutter release button 18. Release button 18 is biased upwardly by an internally disposed helical spring 152.

Shutter mechanism 16 is illustrated in a pre-exposure or rest position in FIG. 6. In this orientation, both shutter opening blade 142 and capping blade 140 cover or block an exposure aperture at 154 and all of the blades are biased toward an electromagnet 156 by a helical spring 158 attached between the extension 148 of the capping blade 140 and a stationary mount 160 attached to the shutter supporting panel. Additionally in this configuration, opening blade 142 is latched in its shutter blocking position by an arm member 162 pivotally mounted upon a stud at 164. A wire spring 166 is coupled between the arm member 162 and a stud 168 extending from the shutter supporting panel to bias the member 162 into engagement with opening blade 142.

Closing blade 144 is powered by a wire spring 170 slidably wound about stud 146. One side of spring 170 is attached to shutter closing blade 144 at 172 and the other side of the spring is attached to capping blade 140 at 174. A similar powering arrangement is provided for the opening blade 142. A portion of a spring 176 supplying such power is revealed in FIG. 7.

To unblock the aperture 154, shutter release button 18 is depressed, thereby causing capping blade 140 to rotate against the bias of spring 158. As the blade 140 is rotated, springs 170 and 176 are wound or "loaded"; shutter opening blade 142 is retained in the aperture blocking position shown in FIG. 6 by arm member 162; and shutter closing blade 144 is retained in the unblocking position shown by virtue of its engagement with electromagnet 156, now energized along leads 178 from an exposure control circuit 180.

As capping blade 142 is rotated to the fully extended position shown in FIG. 7, it functions to cam against arm member 162, thereby permitting the release of shutter opening blade 142. In its fully opened position, an annular opening 182 within capping blade 140 lie in registry with aperture opening 154. Under the bias of spring 176, shutter opening blade 142 moves to the uncovering position shown in FIG. 7, at which point it abuts against a flange 184 formed in capping blade 140.

Following an interval determined by exposure control circuit 180, electromagnet 156 will be deenergized, thereby releasing shutter closing blade 144 for movement under the bias of spring 170 into a blocking position. When in such blocking position, blade 144 will abut against shutter opening blade 142. A release of shutter release button 18 permits the entire assembly to re-assume the configuration of FIG. 6 under the bias of spring 158. A detailed description of the foregoing shutter mechanism and exposure control circuit 180 is provided in a co-pending application for United States patent, entitled "Photographic Exposure Control Apparatus" by Bruce K. Johnson and Otto E. Wolff, Ser. No. 673,574, filed Oct. 9, 1967, and assigned in common herewith.

Shutter release button 18 is also configured for manual rotation between two positions designated "E" and "F" and shown in FIG. 3. These positions, respectively, represent an exposure mode of operation and a focusing mode of operation. A small vertical groove 19 formed within shutter release button 18 promotes proper rotational orientation of the shutter release button. When detent 19 is aligned with focusing mode position "F", a double pull switch 190 (FIGS. 6 and 7) is thrown into a focusing mode configuration. This configuration overrides exposure control circuit 180 to cause a continued energization of electromagnet 156. A power and override line 191 is generally depicted extending from switch 190 to the exposure control circuit 180. The basic battery power supply of circuit 180 is used not only for powering electromagnet 156, but also solenoid 136. When shutter release button 18 is depressed and switch 150 is in a focusing mode, shutter closing blade 144 will be held in an unblocking position, thereby permitting a continuous imaging at viewing surface 64.

Switch 190 also serves to energize solenoid 136 (FIG. 5) from circuit 180, thereby causing rod 134 to be extended. The latter extension causes auxiliary shutter blade 118 to move from its blocking position at 118' to an unblocking position 118. As a consequence, viewing surface 64 may be observed through the viewing arrangement 32.

Following appropriate focusing procedures, shutter release button 18 is rotated until groove or index 19 is oriented with exposure mode position "E". In this orientation, switch 190 is opened and exposure control circuit 180 is permitted to operate conventionally. During the latter operation, a light sensitive network functions to measure the intensity of scene brightness and to regulate the duration of energization of electromagnet 156.

OPERATION

A photographic sequence is initiated with the manual rotation of knob 82 in a direction causing operator unit 76 to move into a focusing mode orientation. This orientation, depicted in FIG. 1, provides for the light sealed covering of exposure plane 44 and the simultaneous operative positioning of viewing surface 64 a finite and closely proximate distance therefrom. Following this maneuver, the operator moves indexing groove 19 of shutter release button 18 to a position for focusing mode operation as designated on the control system housing 12 at "F". Switch 190 is actuated, thereby energizing electromagnet 156 and solenoid 136. The energization of solenoid 136 causes auxiliary shutter blade 118 to move to an open position unblocking the optical path from surface 64 through viewing arrangement 32. The energization of electromagnet 156 will cause the retention of shutter closing blade 144 in an aperture unblocking position.

The shutter release button is then depressed as the operator looks through viewing arrangement 32 from station 74. Following any necessary focusing adjustment to lens system 14, shutter release button 18 is released and rotated until index groove 19 is opposite exposure position "E". This secures the exposure chamber for an exposure sequence by causing the de-energization of solenoid 136 and cancelling an override of electromagnet 156. As a consequence of the de-energization of solenoid 136, shutter blade 118 is returned under the bias of spring 122 to a blocking position shown at 118′.

Shutter release button is again depressed to cause a conventional exposure of film units 46 through the shutter mechanism 16. Knob 82 is rotated to cause operator unit 76 to move into an exposure configuration as shown in FIG. 2. In this configuration, the operator unit 76 is magnetically latched by virtue of the union of metallic member 92 with permanent magnet 98. Thus positioned, operator unit 76 provides a reflecting surface 104 while uncovering the exposure plane 44.

Since certain changes may be made in the above apparatus without departing from the scope of the invention, it is intended that all matter contained in the above description or shown in the accompanying drawings shall be interpreted as illustrative and not in a limiting sense.

What is claimed is:

1. A reflex photographic camera having focusing and exposure operational modes comprising in combination:
   means for supporting a photosensitive material at an exposure plane;
   lens means for focusing the image of a subject at a focal plane;
   means establishing an optical path from said lens means to said focal plane, said optical path establishing means including specular reflecting surface means for establishing said focal plane at said exposure plane during said exposure mode and for establishing said focal plane at a viewing surface in parallel adjacency with said exposure plane for said focusing mode;
   means for viewing an image of said subject at said viewing surface during said focusing mode; and
   means for effecting the exposure of said photosensitive material during said exposure mode.

2. A reflex photographic camera having focusing and exposure operational modes comprising in combination:
   means for supporting a photosensitive material at an exposure plane;
   lens means for focusing the image of a subject at a focal plane;
   means establishing an optical path from said lens means to said focal plane, said optical path establishing means including specular reflecting surface means for establishing said focal plane at said exposure plane for said exposure mode and for establishing said focal plane at a viewing surface during said focusing mode;
   means for viewing an image of said subject at said viewing surface during said focusing mode;
   means associated with said viewing surface for directing rays of light incident thereon from said specular reflecting surface means substantially toward said viewing means; and
   means for effecting the exposure of said photosensitive material during said exposure mode.

3. A reflex photographic camera having focusing and exposure operational modes comprising in combination:
   means for supporting a photosensitive material at an exposure plane;
   means for establishing a viewing surface having a focusing position closely proximate said exposure plane;
   lens means for focusing the image of a subject at a focal plane;
   means establishing an optical path from said lens means to said focal plane, said optical path establishing means including specular reflecting surface means for establishing said focal plane at said exposure plane for said exposure mode and for establishing said focal plane at said viewing surface for said focusing mode;
   operator means for causing said specular reflecting surface means to reflect from one position during said exposure mode, to reflect from another position during said focusing mode, and for causing the said viewing surface to assume said focusing position for said focusing mode;
   means for viewing an image of said subject at said viewing surface during said focusing mode; and
   means for effecting the exposure of said photosensitive material during said exposure mode.

4. The photographic camera of claim 3 in which said specular reflecting surface means comprises:
   a first specular reflecting surface having an exposure mode position selected to cause a coincidence of said focal plane with said exposure plane; and
   a second specular reflecting surface positioned closely proximate and rearwardly of said first specular reflecting surface during said exposure mode.

5. The photographic camera of claim 4 wherein said operator means is operative to cause said first specular reflecting surface to be positioned out of said optical path when said camera is in said focusing mode.

6. The photographic camera of claim 4 in which:
   said first specular reflecting surface is movable from said one reflecting position; and
   said second specular reflecting surface is stationary.

7. The photographic camera of claim 3 wherein said operator means is operative to isolate said exposure plane from actinic radiation during said focusing mode.

8. The photographic camera of claim 3 in which said specular reflecting surface means comprises:
   a first specular reflecting surface having an exposure mode position selected to cause a coincidence of said focal plane with said exposure plane, and a focusing mode position operatively isolated from said optical path; and
   a second specular reflecting surface having a focusing mode position selected to cause a coincidence of said focal plane with said viewing surface.

9. The photographic camera of claim 8 in which said second specular reflecting surface is stationary and positioned closely proximate and in isolation from said first specular reflecting surface during said exposure mode.

10. The photographic camera of claim 3 in which:
    said specular reflecting surface means includes a first specular reflecting surface mounted upon and movable with said operator means; and
    a second specular reflecting surface stationary with respect to said first specular reflecting surface and oriented to cause a coincidence of said focal plane with said viewing surface during said focusing mode.

11. The photographic camera of claim 10 wherein said operator means is operative to orient said first specular reflecting surface in an exposure mode position selected to cause a coincidence of said focal plane with said exposure plane.

12. The photographic camera of claim 11 wherein said operator means is operative to orient said first specular reflecting surface in a position isolated from said optical path for said focusing mode.

13. The photographic camera of claim 10 wherein said viewing surface is mounted upon and movable with said operator means.

14. The photographic camera of claim 10 in which:
said viewing surface is mounted upon said operator means in a position oppositely disposed from said first specular reflecting surface; and
said operator means is operative to cause said viewing surface to assume said focusing position and, coincidently, to orient said first specular reflecting surface in a focusing mode position.

15. The photographic camera of claim 10 wherein said viewing surface is formed incorporating an echelon reflecting surface.

16. The photographic camera of claim 10 wherein said viewing means comprises an optical system having an entrance pupil, said system being positioned for viewing said viewing surface from a side of said viewing surface upon which light is incident.

17. A reflex photographic camera having focusing and exposure operational modes comprising in combination:
means for supporting a photosensitive material at an exposure plane;
lens means for focusing the image of a subject at said exposure plane along an optical path of predetermined length;
operator means for positioning a first specular reflecting surface within said optical path in a location maintaining said length to derive an optical path orientation for said exposure mode and for positioning a viewing surface within said optical path before said exposure plane to derive an optical path orientation for said focusing mode;
a second specular reflecting surface positioned for intercepting said path during said focusing mode, said second specular reflecting surface being positioned a distance from the said exposure mode position of said first specular reflecting surface selected to establish a focusing optical path to said viewing surface having a length equivalent to said predetermined length;
means for effecting the exposure of said photosensitive material during said exposure mode; and
means for viewing an image of said subject at said viewing surface during said focusing mode.

18. The photographic camera of claim 17 wherein said operator means is operative to cause said first specular reflecting surface to be positioned out of said optical path during said focusing mode.

19. The photographic camera of claim 17 in which said operator means is operative to isolate said exposure plane from actinic radiation during said focusing mode.

20. The photographic camera of claim 17 in which:
said operator means is operative to cause said first specular reflecting surface to be positioned out of said optical path for said focusing mode; and
said second specular reflecting surface is stationary.

21. The photographic camera of claim 17 in which said second specular reflecting surface is stationary and positioned closely proximate and in isolation from said first specular reflecting surface during said exposure mode.

22. The photographic camera of claim 17 wherein said operator means is operative to orient said viewing surface in a position isolated from said optical path for said exposure mode.

23. The photographic camera of claim 22 in which:
said first specular reflecting surface and said viewing surface are mounted upon and movable with said operator means; and said operator means is movable from one position establishing said focusing mode optical path orientation to another position establishing said exposure mode optical path orientation.

24. The photographic camera of claim 23 wherein said viewing surface is mounted upon said operator means in a position oppositely disposed from said first specular reflecting surface.

25. The photographic camera of claim 24 wherein said viewing means comprises an optical system having an entrance pupil, said system being positioned for viewing said viewing surface from a side of said viewing surface upon which light is incident.

26. The photographic camera of claim 25 in which said operator means is operative to isolate said exposure plane from actinic radiation during in said focusing mode.

27. The photographic camera of claim 25 wherein said viewing surface is formed incorporating an echelon reflective surface.

28. The photographic camera of claim 27 wherein said echelon surface is configured to reflect light rays incident thereon from said optical path toward said viewing means during said focusing mode.

29. A reflex photographic camera having focusing and exposure operational modes comprising in combination:
means for supporting a photosensitive material at an exposure plane;
lens means for focusing the image of a subject at said exposure plane along an optical path of predetermined length;
operator means configured to support a first specular reflecting surface and a viewing surface opposite from an adjacent thereto, said operator means being movable for positioning said first specular reflecting surface within said optical path in a location maintaining said length for said exposure mode and for positioning said viewing surface within said optical path before and closely proximate to said exposure plane for said focusing mode;
a second specular reflecting surface positioned for intercepting said path during said focusing mode, said second specular reflecting surface being positioned a distance from the said exposure mode position of said first specular reflecting surface selected to establish a focusing optical path to said viewing surface having a length equivalent to said predetermined length;
means for effecting the exposure of said photosensitive material during said exposure mode; and
means for viewing an image of said subject at said viewing surface during said focusing mode.

30. A reflex photographic camera comprising:
means for supporting a photosensitive material at an exposure plane;
means defining a taking lens;
reflex means defining one surface for reflecting light from said taking lens toward said exposure plane when in an exposure mode position and an oppositely disposed surface for reflecting light deriving from said taking lens toward a viewing station when in a viewing mode position;
means for selectively moving said reflex means between said viewing and exposure mode positions; and
means for effecting the exposure of said photosensitive material when said reflex means is in said exposure mode position.

31. The photographic camera of claim 30 in which said reflex means one surface for reflecting light from said taking lens toward said exposure plane is a substantially planar reflecting surface.

32. The photographic camera of claim 30 in which said reflex means oppositely disposed surface for reflecting light from said taking lens toward a viewing station is present as an echelon reflector surface.

33. The photographic camera of claim 30 in which said reflex means is opaque to the transmission of light therethrough and is shaped having a surface at least co-extensive with the periphery of said exposure plane.

34. The photographic camera of claim 30 in which said reflex means one surface and oppositely disposed surface are configured as substantially parallel surfaces mounted in back-to-back relationship.

35. The photographic camera of claim 30 further including a fixed reflective surface positioned within said camera to reflect light from said taking lens toward said oppositely disposed surface for reflecting light toward said viewing station when said reflex means is in said viewing mode position.

36. The photographic camera of claim 35 in which said means for selectively moving said reflex means is operative to move said reflex means surface for reflecting light toward said viewing station into surface-to-surface adjacency with said fixed reflective surface when in said exposure mode position, thereby substituting said one surface for reflecting light in place of said fixed reflective surface.

37. The photographic camera of claim 36 in which said reflex means is so configured and dimensioned that, when in said viewing mode position, said oppositely disposed surface is spaced above said exposure plane a distance equivalent to that distance spacing said fixed reflective surface from said one reflective surface when said reflex means is in said exposure mode position, whereby the said mean optical path distance established from said taking lens to said exposure plane is equivalent to the mean optical path established from said taking lens to said oppositely disposed surface when said reflex means is in said viewing mode position.

* * * * *